UNITED STATES PATENT OFFICE.

HULDA A. SHEPARD, OF LAKESIDE, WASHINGTON.

ARTICLE OF FOOD.

1,257,410. Specification of Letters Patent. Patented Feb. 26, 1918.

No Drawing. Application filed April 30, 1917. Serial No. 165,631.

*To all whom it may concern:*

Be it known that I, HULDA A. SHEPARD, citizen of the United States, residing at Lakeside, in the county of Chelan and State of Washington, have invented a certain new and useful Improvement in Articles of Food, of which the following is a specification.

This invention relates to an improved food product in the form of a cooked unsweetened compressed fruit pulp possessing the color, flavor and gelatinous substances inherent in the raw fruit.

The product is in the form of a substantially solid mass which can be easily handled, and shipped without deterioration, and which admirably retains its original strength and flavor in different climates.

The invention is designed for utilization by the preserving process, of the great quantities of apples and other fruits as well as some forms of vegetables which are each year wasted for different reasons such as the grading rules of the various fruit growers' associations which prevent the shipping of certain fruit by reason of mis-shapes, under-color, under-size, or having slight blemishes of the skin, or bruises. By utilizing such stock in forming the present article of manufacture therefrom, the same becomes a valuable food product which employs only wholesome edibles and does not violate any of the rules of the pure food or similar laws.

The product is advantageous over dried fruit, as the same possesses much greater food value than dried fruit, due to preserving in the product of the natural fruit substances, is more appetizing, more easily prepared, and may be sold more cheaply to the consumer.

The product may be readily used extensively in the Army, and may be made of apples, apricots, prunes, pears, peaches, and many other fruits as well as vegetables and has proved serviceable in the climates of the Pacific coast, Gulf of Mexico, Cuba, and also in colder climates, it being noted by way of example that three ounces of the product affords one pint of thick fruit sauce when prepared for eating.

While I do not wish to limit myself to the exact manner of manufacturing the product, the following process is described by way of example which has been carried into advantageous use.

The fruit or vegetables to be utilized, such as apples for instance, are first thoroughly washed and then placed in boiling water and boiled for a length of time sufficient to soften them to such a degree that they take the form of pulp. This pulp is forced through a strainer of any form desired, such as a fine mesh sieve or loosely woven fabric, whereby the stems, seeds, and cores as well as foreign particles are extracted. The pulp is then again boiled for a length of time sufficient to substantially evaporate the water contents thereof. The pulp product is then divided into portions or cakes of suitable form and size, and then cooled whereby such portions or cakes solidify into the finished product. It is to be understood that the term hardened is used in the appended claims not to convey the meaning that the product is of such solidity as is characteristic of rock or the like, but such term is to convey the idea that the present product is comparatively solid and more highly concentrated than jelly, the moisture being practically entirely extracted from the fruit pulp when producing the present product. Also, the term block is used in the claims to designate a mass or body of pulp of any desired configuration, said term not meaning specifically a cube form of product.

The product so formed may then be enveloped in paraffined wrappings and sealed if desired. Any kind of fruit or vegetables may be used and in said form of separate portions or cakes, the product is ready for shipment and sale, it being only necessary when desired to use the same to boil one or more of the cakes in water, whereby the cake produces a quantity of appetizing sauce or preserves having substantially the natural taste and flavor of the fruit from which it is made, rendering the same readily serviceable where the fruit and vegetables are unobtainable. Also, the fruit is very desirable in the solid form as a filling for sandwiches or to be eaten as a confection. By reason of the product being pre-cooked with the skins, seeds and cores of the fruit unremoved during the preliminary or pre-cooking step, all the original color and flavor of the fruit and the gelatinous properties of the seeds and cores is retained, rendering the product extremely edible and wholesome. The food product thus produced, in its finished form, is a seedless, skinless, and coreless concentrated fruit pulp, possessing however the flavoring matter of the fruit and the color of the fruit skins, and the valuable gelatinous substance of the fruit seeds and cores. Other steps than as herein described may be practised for effecting the desired evaporation of water from the cooked pulp, it being essential however in any process employed for producing the product, to pre-cook, that is reduce the fruit to a pulp as by boiling, prior to the extraction of the skins, seeds and cores from the fruit, so as to retain the desired properties of such skins, seeds, and cores, in the finished product.

What I claim as new is:—

1. A food product consisting of a block of hardened concentrated fruit pulp having the moisture extracted therefrom and possessing the flavoring matter and color of the fruit skins, and the gelatinous substance of the fruit seeds and cores.

2. A food product consisting of a hardened block of concentrated fruit pulp having the moisture extracted therefrom, the flavoring matter and color of the fruit skins and the gelatinous substance of the fruit seeds being retained in the product by pre-cooking the fruit with the skins and seeds unremoved.

3. A food product consisting of a hardened block of concentrated fruit pulp formed by reducing the fruit to pulp by boiling the same with the skins, cores and seeds unremoved to retain the flavoring matter and color of the skins and the gelatinous substance of the seeds and cores, extracting the skins, seeds and cores, and then extracting the moisture from the pulp.

4. A food product consisting of a hardened block of concentrated fruit pulp having the moisture extracted therefrom and possessing the flavoring matter and color of the fruit skins and the gelatinous substance of the seeds and cores of the fruit, said matter, color and substance being retained in the product by boiling the fruit with the skins, seeds and cores, unremoved.

In witness whereof, I hereunto subscribe my name this 21st day of April, A. D. 1917.

HULDA A. SHEPARD.

Witnesses:
SARAH M. SHEPARD,
MARY R. CROSS.